Nov. 20, 1928.   1,691,986
H. NYQUIST
APPARATUS AND METHOD FOR GENERATING PURE
SINE WAVES OF ELECTROMOTIVE FORCE
Filed March 30, 1922    3 Sheets-Sheet 1

INVENTOR.
H. Nyquist
BY Carl A. Richmond
ATTORNEY

Nov. 20, 1928.

H. NYQUIST 1,691,986

APPARATUS AND METHOD FOR GENERATING PURE
SINE WAVES OF ELECTROMOTIVE FORCE

Filed March 30, 1922      3 Sheets-Sheet 2

INVENTOR.
H. Nyquist
BY Carl A. Richmond
ATTORNEY

Nov. 20, 1928.  1,691,986
H. NYQUIST
APPARATUS AND METHOD FOR GENERATING PURE
SINE WAVES OF ELECTROMOTIVE FORCE
Filed March 30. 1922  3 Sheets-Sheet 3
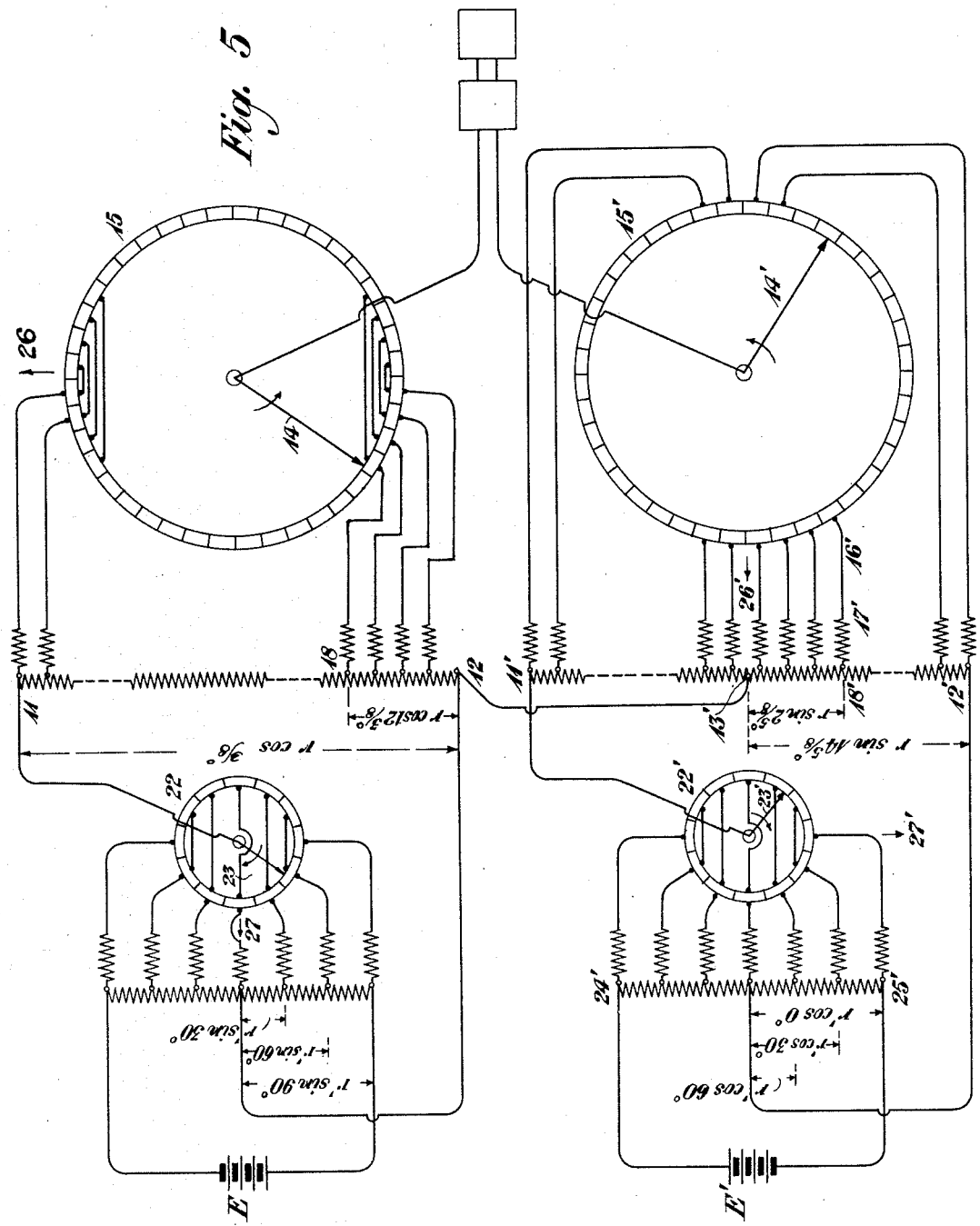
*INVENTOR.*
*H. Nyquist*
BY
*Carl U. Richmond*
ATTORNEY Patented Nov. 20, 1928.

1,691,986

UNITED STATES PATENT OFFICE.

HARRY NYQUIST, OF ELMHURST, NEW YORK, ASSIGNOR TO AMERICAN TELEPHONE AND TELEGRAPH COMPANY, A CORPORATION OF NEW YORK.

APPARATUS AND METHOD FOR GENERATING PURE SINE WAVES OF ELECTROMOTIVE FORCE.

Application filed March 30, 1922. Serial No. 548,156.

The principal object of my invention is to provide a new and improved method and apparatus for the generation of pure sine waves of electromotive force of comparatively low frequency. Another object of my invention is to generate an approximate sine wave of low frequency electromotive force with only such higher harmonics present as can readily be eliminated by a filter. These and other objects of my invention will become apparent upon consideration of several specific embodiments of the inventive idea which I have chosen for disclosure in the following specification. With the understanding that the invention will be defined in the appended claims, I will now proceed to describe these examples.

Figure 1:
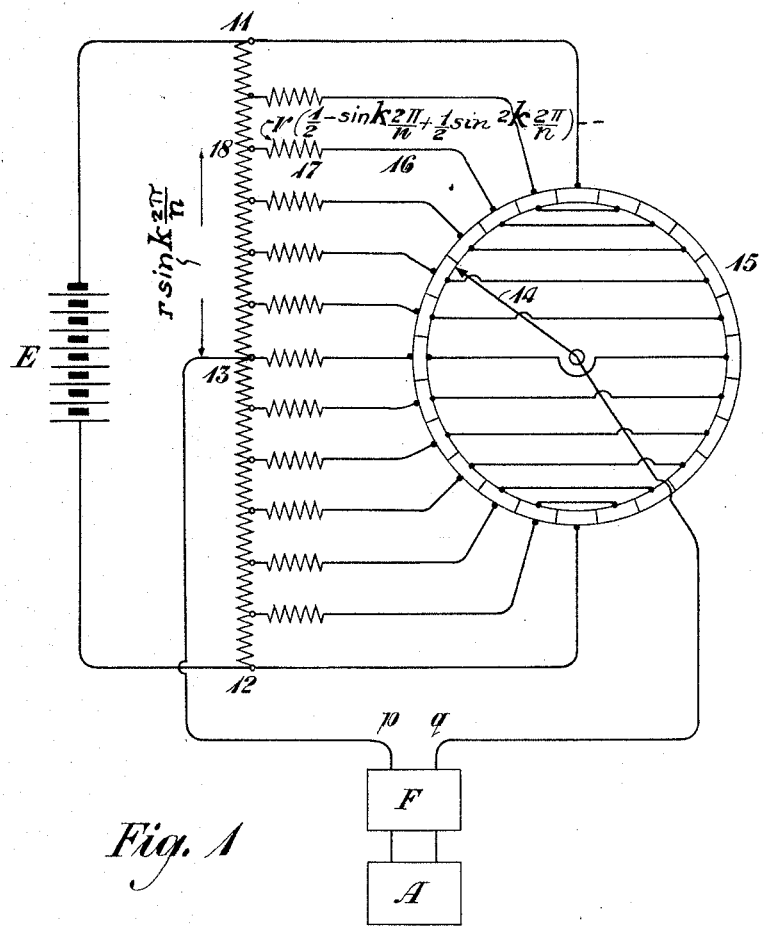
Figure 2:
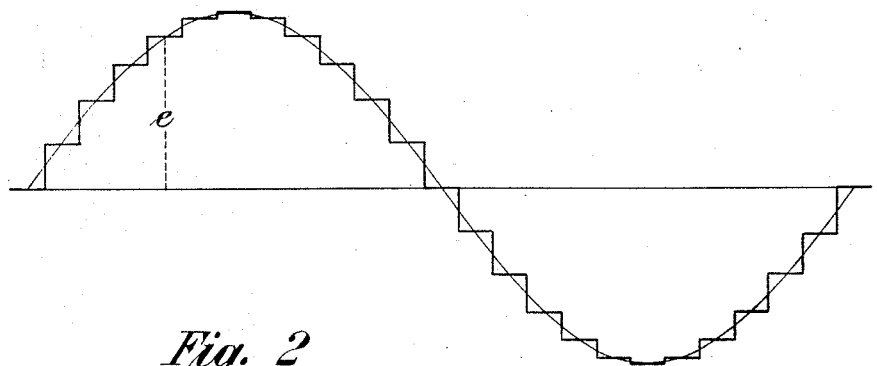
Figure 3:
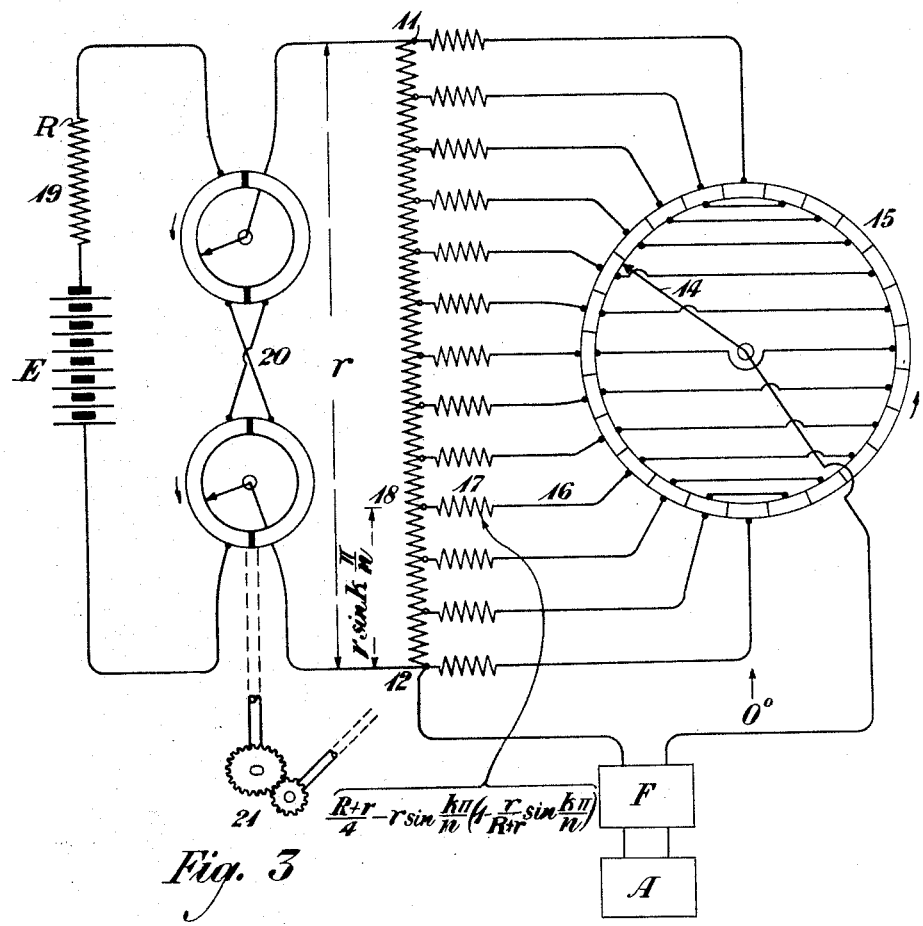
Figure 4:
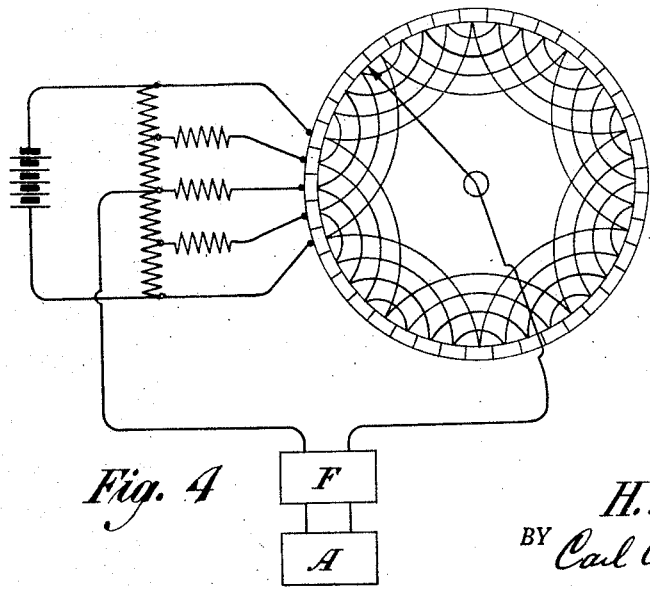

Referring to the drawings, Figure 1 is a diagram showing suitable apparatus for practicing my invention. Fig. 2 is a diagram that will be referred to in connection with the explanation of Fig. 1. Fig. 3 is a diagram for a modified embodiment of the invention. Fig. 4 is a diagram showing how a plurality of cycles per second of electromotive force may be obtained for a single revolution of the distributor employed, and Fig. 5 is a diagram showing how a sine wave of electromotive force may be obtained with the distributor making a plurality of revolutions per cycle.

From the terminals of the battery of electromotive force E in Fig. 1, conductors are taken to the ends of a potentiometer resistance 11—12. At various points 18 along this resistance, taps 16 are taken, each comprising a resistance 17. These taps 16 are connected to respective segments of the distributor ring 15, engaged in succession by the rotating brush or wiper 14. From the brush 14 and the middle point 13 of the resistance 11—12 conductors are taken to a low-pass filter F and thence to apparatus A to which the pure sine wave electromotive force is desired to be applied.

Assuming that the distributor 15 has $n$ segments, $n$ being a multiple of 4, the taps 16 are taken at such points that the resistance of the portion 13—18 will be given by the formula $$r \sin k\frac{2\pi}{n}$$

where $k$ takes in succession the values 0, 1, 2, ... $n/4$, and where $r$ may be a unit resistance of any convenient value; a value $r=1,000$ ohms would be suitable for many purposes. The whole resistance 11—12 is $2r$.

Within each tap 16 is comprised a resistance 17, whose value is given by the formula $$r\left(\frac{1}{2} - \sin k\frac{2\pi}{n} + \frac{1}{2}\sin^2 k\frac{2\pi}{n}\right)$$

It can readily be shown that with the values given in the foregoing formulæ, the internal resistance is constant and equal to $r/2$. By the internal resistance I mean the resistance of the apparatus looking back from the filter F.

The open circuit input electromotive force across the terminals $p$, $q$ is given by the expression $$E\frac{r \sin k\frac{2\pi}{n}}{2r}$$

Accordingly, this filter input voltage will be as shown by the stepped solid line in Fig. 2, each step corresponding to a segment of the distributor ring 15, and the ordinate of the middle point of each step corresponding to the sine curve, whose equation is $$e = 1/2\, E \sin k\frac{2\pi}{n}$$

I will now show that if the stepped wave form shown in Fig. 2 is analyzed into a Fourier series, the lowest frequency harmonic present will be that for which the frequency is $n-1$ times the fundamental frequency. For the exact design of Fig. 1, this means that the lowest harmonic is the 23rd.

Let the distributor speed be $p/2\pi$ revolutions per second. The ordinates of the stepped line of Fig. 2 have the values given in the following table for the respective ranges:

| From— | To— | $e=f(pt)$ |
|---|---|---|
| $pt=-\frac{\pi}{n}$ | $pt=\frac{\pi}{n}$ | $=0$ |
| $\frac{\pi}{n}$ | $\frac{3\pi}{n}$ | $\frac{E}{2}\sin\frac{2\pi}{n}$ |
| $\frac{3\pi}{n}$ | $\frac{5\pi}{n}$ | $\frac{E}{2}\sin 2\cdot\frac{2\pi}{n}$ |
| $\frac{2n-3}{n}\pi$ | $\frac{2n-1}{n}\pi$ | $\frac{E}{2}\sin(n-1)\frac{2\pi}{n}=-\frac{E}{2}\sin\frac{2\pi}{n}$ |
| $\frac{2n-1}{n}\pi$ | $\frac{2n+1}{n}\pi$ | $\frac{E}{2}\sin 2\pi=0$ |

The general Fourier series for this stepped line is $f(pt) = b_1 \sin pt + b_2 \sin 2pt + \ldots b_m \sin m\,pt + \ldots$
where $$b_m = \frac{1}{\pi}\int_0^{2\pi} f(pt) \sin m\,pt \cdot d(pt)$$

$$= \frac{1}{m\pi}\sum_1^n k \frac{E}{2} \sin k\frac{2\pi}{n} \int_{\frac{\pi(2k-1)m}{n}}^{\frac{\pi(2k+1)m}{n}} \sin m\,pt\,d(m\,pt)$$

$$= \frac{1}{m\pi}\sum_1^n k \frac{E}{2} \sin k\frac{2\pi}{n}\left[\cos\frac{m\pi}{n}(2k-1) - \cos\frac{m\pi}{n}(2k+1)\right]$$

$$= \frac{E}{m\pi}\sin\frac{m\pi}{n}\sum_1^n k \sin m\frac{2\pi k}{n} \sin\frac{2\pi k}{n}$$

$$= \frac{E}{2m\pi}\sin\frac{m\pi}{n}\sum_1^n k\left[\cos k\frac{2(m-1)\pi}{n} - \cos k\frac{2(m+1)\pi}{n}\right]$$

In the foregoing the character "$m$" is the number of the general term in the expansion of $f(pt)$, and $b_m$ means the coefficient of the $m$th term.

When $m = 1$ this becomes $$b_1 = \frac{E}{2\pi}\sin\frac{\pi}{n}\sum_1^n k\left(1 - \cos 2k\frac{2\pi}{n}\right) = \frac{E}{\pi}\sin\frac{\pi}{n}\sum_1^n k\,\sin^2 k\frac{2\pi}{n}$$

$$= \frac{E}{\pi}\sin\frac{\pi}{n}\sum_1^{n/4} k\left[\sin^2 k\frac{2\pi}{n} + \sin^2\left(\frac{\pi}{2} + k\frac{2\pi}{n}\right)\right]\cdot 2$$

$$= \frac{E}{\pi}\sin\frac{\pi}{n}\cdot\frac{n}{4}\cdot 2 = \frac{E}{2}\cdot\frac{n}{\pi}\sin\frac{\pi}{n}$$

This gives the amplitude of the fundamental wave.
When $m = n-1$, $$b_m = \frac{E}{2(n-1)\pi}\sin\frac{n-1}{n}\pi\sum_1^n k\left[\cos 2k\frac{n-2}{n}\pi - 1\right]$$

$$= \frac{E}{2(n-1)\pi}\sin\frac{\pi}{n}\sum_1^n k\left[\cos 2k\frac{2\pi}{n} - 1\right] = \frac{E}{2(n-1)\pi}\sin\frac{\pi}{n}\sum_1^n k\left(-2\sin^2 k\frac{2\pi}{n}\right)$$

$$= -\frac{E}{(n-1)\pi}\sin\frac{\pi}{n}\sum_1^n k\,\sin^2 k\frac{2\pi}{n} = -\frac{E}{2}\cdot\frac{1}{n-1}\cdot\frac{n}{\pi}\sin\frac{\pi}{n}$$

This gives the amplitude of the $(n-1)$th harmonic.

For values of $m$ lying in the range 2, 3, . . . . $(n-2)$, it can readily be proved that the summation of each cosine term of the formula for $b_m$ gives zero. This is because for each value of $k$ that gives one value to the cosine, there is another value of $k$ that gives to it an equal and opposite value. Hence we have established that excepting the fundamental, all harmonics below the $(n-1)$th are absent. In general, it may be shown that the only harmonics present are those corresponding to the formula $sn \pm 1$, where $s$ is an integer, so that for $n=24$ as in Fig. 1, the harmonics present are the 23rd, 25th, 47th, 49th, 71st, 73rd . . . . $(24s-1)$th, $(24s+1)$th. . . .

The Fourier series written down heretofore, takes the form $$f(pt) = \frac{E}{2} \frac{n}{\pi} \sin \frac{\pi}{n} \left[ \sin pt - \frac{1}{n-1} \sin(n-1)pt + \ldots \right]$$

While the proof has been given for a value of $n$ that is a multiple of 4, it can be proved in a somewhat similar manner for any integer value of $n$.

In the particular case represented in Fig. 1, where $n=24$ it will be seen that all the harmonics from the lowest above the fundamental to the 22nd are absent and the lowest harmonic that is present is the 23rd. Accordingly, if the low-pass filter F is made to have its critical frequency at a suitable value intermediate between the frequency of the fundamental and the 23rd harmonic, then it will effect a very through separation, passing substantially only the fundamental and shunting out the harmonics. This is because a low-pass filter discriminates in high degree between frequencies considerably removed from its critical frequency, although it may be that the discrimination is not so sharp for frequencies close to the critical frequency.

For many measurements in connection with the testing of telegraph systems and elsewhere it is desirable to have a source of voltage which shall be very nearly sinusoidal and of low frequency. When dynamo electric generators are used for this purpose they are unsatisfactory because the wave shape is far from sinusoidal, and unless special precautions are taken the speed is likely to be variable. Moreover, a single generator can be adjusted for only a narrow range of frequencies. While vacuum tube oscillators may be useful for high frequencies they give a poor wave shape at low frequency and involve some uncertainty and variation in calibration. Considerable care is required to make sure of the frequency value at a given moment of performance.

By my invention there is generated a fundamental sine wave of electromotive force with certain higher harmonics, but without lower harmonics, and the separation of the higher harmonics by a filter is an easy matter.

By using a distributor of the type developed for multiplex telegraphy, a very constant standard speed is obtained, so that we may rely confidently on the frequency of the fundamental sine wave of electromotive force. The motor driving the distributor can have its speed varied from 2.5 revolutions per second to 6.0 R. P. S. The distributor can be connected directly to the motor shaft or have its speed stepped down by means of gears in the ratio of 1 to 5 or 1 to 2.

Hence, it will be seen that the speed of the distributor can be varied from 0.5 to 6.0 R. P. S. Accordingly, this is the practicable frequency range of cycles per second with the apparatus shown in Fig. 1.

For convenience in drawing I have shown only 24 segments in the distributor 15, but 80 is a practicable number and evidently gives a wider separation between the fundamental and the lowest harmonic present. By omitting every other tap and connecting the segments together in pairs, an 80 segment distributor can be changed to a 40 segment distributor, etc.

It will be seen that the maximum voltage delivered by the apparatus of Fig. 1 is only half the battery voltage E. In Fig. 3, I have shown an arrangement by which a greater part of the battery E is available for the maximum voltage to be delivered. A resistance R is placed in series with battery E to guard against a possible short circuit by the reversing switch to be mentioned presently. A switch 20 is driven by gears 21 at half the angular velocity of the distributor arm 14. It will be seen that one complete revolution of the distributor arm 14, starting from its lowermost position, gives a positive half cycle of electromotive force. Upon the completion of this revolution of the arm 14 the switch 20 reverses the connection of the battery E so that the next half wave is negative. With the connections shown in Fig. 3, and the legends inscribed thereon, the principle of operation can readily be established in view of the discussion that has been given for Fig. 1. The internal resistance in this case is $$\frac{R + r}{4}$$

Fig. 4 shows a modification of Fig. 1 by which a plurality of cycles of electromotive force are obtained for each revolution of the distributor arm. In the particular example shown in the drawing, the distributor has 40 segments which are grouped in five sets of eight each. This makes the lowest harmonic the 7th. It is evident that this method of increasing the frequency with a given number of commutator segments and a given distributor speed brings the frequency of the lowest present harmonic closer to the fundamental and involves some loss in discrimination by the filter F.

While Fig. 4 shows how several cycles of electromotive force may be obtained per revolution of the distributor. Fig. 3 shows how two revolutions of the distributor may be made to generate only one cycle of electromotive force. In Fig. 5, I have shown how apparatus may be arranged to generate only a single cycle of electromotive force on a large number of rotations of the distributor arm. More particularly, in this case I make a single cycle of electromotive force correspond to 12 distributor cycles.

The two segmental rings 15 and 15' are concentric rings of the same distributor. In this particular example each ring has 40 segments. I will make my description for this number specifically, believing that the principle for other numbers will readily be apparent.

From the midpoint 13' of the resistance 11'—12' the resistance steps to the taps 18' are represented by the formula $$r \sin (3/8° + k\, 3/4°)$$

the successive values being $r \sin 3/8°$, $r \sin 1\text{-}1/8°$, $r \sin 1\text{-}7/8° \ldots r \sin 14\text{-}5/8°$. The corresponding voltages across these resistances from 13' to 12' are positive and from 13' to 11' are negative.

The resistances $r$ and $r'$ (to be mentioned presently) are given convenient arbitrary values.

The arm 23' is driven at 1/12 the speed of the arm 14' and passes from one segment to the next as the arm 14' passes the position on the extreme right opposite the arrow 26' which indicates the zero position for arm 14'. The zero position of the arm 23' is when pointing down as indicated by the arrow 27'; beginning with the corresponding segment the resistance values tapped from the potentiometer 24', 25' are in succession $r'$ ($=r' \cos 0°$), $r' \cos 30°$, $r' \cos 60°$, $0$, $r' \cos 60°$, $r' \cos 30°$, $r'$.

For the distributor 15 the resistance values tapped on 11—12 from the end 12 are respectively equal to $r$ times the cosine of an angle which takes the successive values 14-5/8°, 13-7/8°, 13-1/8°, 12-3/8°, ... 3/8°. As the arm 14 passes the position opposite the zero position 26, the switch arm 23 passes from one contact to the next of segmental ring 22, whose zero position is given by the arrow 27.

The open circuit voltage from the battery E' across the points 11', 12' is:

$$\frac{E' \cos k'\, 30°}{2 + \dfrac{r'}{2r \sin 14\text{-}5/8°}} = \frac{E' \cos X}{2 + \dfrac{r'}{2r \sin 14\text{-}5/8°}}$$

where $X = k'\, 30°$.

The open circuit voltage across 13', 18' is $$\frac{E'(\cos X) r \sin (3/8° + k\, 3/4°)}{\left(2 + \dfrac{r'}{2r \sin 14\text{-}5/8°}\right) 2r \sin 14\text{-}5/8°}$$

$$= \frac{E' \cos X \sin Y}{\left(2 + \dfrac{r'}{2r \sin 14\text{-}5/8°}\right) 2 \sin 14\text{-}5/8°}$$

where $Y = 3/8° + k\, 3/4°$.

Now choose $$E' = E \frac{4r \sin 14\text{-}5/8° + r'}{2r \cos 3/8° + r'}$$

and the foregoing expression for the open circuit voltage across 13', 18' becomes $$\frac{E \cos X \sin Y}{2 \cos 3/8° + r'/r}$$

The open circuit voltage across 11, 12 is $$\frac{E \sin X}{2 + \dfrac{r'}{r \cos 3/8°}}$$

The open circuit voltage across 12, 18 is $$\frac{E \sin X}{2 + \dfrac{r'}{r \cos 3/8°}} \cdot \frac{r \cos Y}{r \cos 3/8°} = \frac{E \sin X \cos Y}{2 \cos 3/8° + r'/r}$$

The total voltage across the contacts 14, 14' is $$\frac{E \cos X \sin Y}{2 \cos 3/8° + r'/r} + \frac{E \sin X \cos Y}{2 \cos 3/8° + r'/r} = \frac{E \sin (X+Y)}{2 \cos 3/8° + r'/r}.$$

With the structure and operative relationships shown in the diagram of Fig. 5, the angle $X + Y$ passes by steps of 3/4° from 3/8° to 359-5/8° and repeats, hence the output will correspond to a diagram like Fig. 2 except with 480 steps instead of 24, and the lowest present harmonic with the apparatus of Fig. 5 will be the 479th.

I claim:

1. The method of producing a low frequency sine wave of electromotive force which involves operating two distributors in tandem, making the resultant period equal to the period of the slower distributor.

2. Apparatus for producing a pure sine wave electromotive force of low frequency comprising a potentiometer, a battery connected thereto, a circuit changing switch between them, a series of taps on the potentiometer, a distributor to make connection thereto in succession, means to operate said switch at the initial point of each distributor cycle, and means to separate higher harmonics from the distributor output.

3. Apparatus for producing a pure sine wave electromotive force of low frequency, comprising a potentiometer, a distributor to take an electromotive force from taps thereof in successive stepped values, said taps being disposed to make said values grade approximately at equal angles along a sine curve, said taps comprising resistances graded to make the internal resistance constant between the distributor terminals, and means to separate the fundamental sine wave from the harmonics.

4. Apparatus for producing a pure sine wave electromotive force of low frequency comprising two potentiometers and respective distributors and respective circuit changing switches, means to advance said switches one step for each revolution of the distributors, said distributors having taps to said potentiometers to give a resultant stepped electromotive force graded in value approximately along a sine curve, and means to separate higher harmonics.

5. Apparatus for producing a pure sine wave electromotive force of low frequency comprising four potentiometers and respective distributors, taps on the potentiometers for potentiometer values corresponding to the factors of the terms of the expression $$\sin X \cos Y + \cos X \sin Y$$

means connecting the distributors to give a stepped electromotive force corresponding to this expression, and means to separate out higher harmonics from the distributor output.

6. In combination, a device to give stepped electromotive forces approximately along a sine curve, said device having constant internal impedance, and a filter to separate out harmonics from the output of said device.

7. The method of producing a pure low frequency sine wave electromotive force which consists in generating a wave approximating thereto with only higher harmonics present and with constant internal impedance in the generator and separating the higher harmonics by means of a wave filter.

In testimony whereof, I have signed my name to this specification this 28th day of March, 1922.

HARRY NYQUIST.